United States Patent [19]
Cobb et al.

[11] Patent Number: 5,504,612
[45] Date of Patent: Apr. 2, 1996

[54] SYNCHRONIZED XY LASER SCANNER

[75] Inventors: Joshua M. Cobb, Millbrook; James H. Covell, II, Poughkeepsie; Franz X. Topolovec, Accord; Uldis A. Ziemins, Poughkeepsie, all of N.Y.

[73] Assignee: International Business Machines Corporation, Armonk, N.Y.

[21] Appl. No.: 443,634

[22] Filed: May 18, 1995

[51] Int. Cl.$^6$ .................................................. G02B 26/08
[52] U.S. Cl. ........................... 359/202; 359/201; 359/900
[58] Field of Search .................................. 359/198–202, 359/900; 250/234; 347/250, 256/ 260; 310/75 R, 177; 348/203; 358/474, 494, 296, 302

[56] References Cited

U.S. PATENT DOCUMENTS 4,985,780 1/1991 Garnier et al. ........................... 358/299

OTHER PUBLICATIONS

General Scanning Inc., "LK4100 Series UV Scanning Kit", 1990.

*Primary Examiner*—James Phan
*Attorney, Agent, or Firm*—Aziz M. Ahsan; DeLio & Peterson

[57] ABSTRACT

An apparatus and method are disclosed for laser raster scanning a substrate in an XY plane wherein a single motor is used to provide synchronized X-Y scanning by two mirrors positioned orthogonally and which move linearly in an XY plane relative to each other by the rotation of the motor shaft. A preferred embodiment uses a specially designed cam to provide back and forth laser scanning motion and an intermittent gear to provide indexing of the laser. The apparatus and method may be configured for various scan speeds, spot sizes, Y-axis indexing and X-axis scan at the object plane. Over scanning of the active XY area of the object plane is preferred to provide constant velocity and energy density over the active XY area.

11 Claims, 3 Drawing Sheets

SYNCHRONIZED XY LASER SCANNER

BACKGROUND OF THE INVENTION

1. Field of the Invention

The present invention relates to a method and apparatus for scanning a light beam on a workpiece such as semiconductor substrate in an XY plane and, in particular, to an inexpensive and cost effective method and apparatus for laser scanning in an XY raster pattern.

2. Description of Related Art

Scanning systems using light and in particular lasers, are employed in many applications. For example, scanning lasers are used in laser printers and to drill holes in a semiconductor substrate to create micro-circuitry, scribe alpha-numerics on a container or part, read bar codes, marking, expose, stenciling, patterning and other related laser or light processes. The goal of scanning is to cover in an XY plane an area with a light source in a systematic and expedient manner and includes both coherent and non-coherent sources such as a laser and an illuminator light source. For convenience, the following description will be directed specifically to lasers since these are the most used systems, however, it will be appreciated by those skilled in the art that the invention could be used for other light sources and for all types of laser systems such as Nd:YAG and HeNe laser systems.

There are various methods and apparatus used today to laser scan an object or mask work piece. These include Galvanometers, servo controlled mirrors, polygon scanners and the like to position the laser beams. In general, before the beam is completely focused it passes through a scanning mechanism which provides the means to scan the beam on a mask plane or work piece bi-directionally. The scanned beam then passes through the mask plane, through an objective lens and onto the work piece substrate One commercial laser scanning apparatus uses post-objective scanning technology comprising a pair of rugged, position-feedback, moving iron Galvanometers with engineered mirrors, optimized for precise positioning of laser beams along the XY axes. A computer in the scanner computes all flat field scan correction and directs vector scan movements on the work piece. Raster scanning can be simulated defining link parallel vector movements. A lower cost optical Galvanometer scanner does not include a positioned sensor to provide feedback for precise positioning and is intended primarily as a lower cost alternative where speed or response or accuracy is not required. Typical applications include facsimile transmissions and optical pointing or tracking.

Scanning systems to be effective must be flexible for various scan speeds, spot sizes, Y-axis indexing and X-axis scans at the object plane and current systems used to perform such XY scanning are complex and expensive.

Bearing in mind the problems and deficiencies of the prior art, it is therefore an object of the present invention to provide an apparatus and a method for laser scanning an object in an XY plane which is inexpensive and cost effective.

A further object of the invention is to provide an improved method and apparatus for laser scanning in which various scan speeds, spot sizes, Y-axis indexing and X-axis scans can be easily and effectively used.

Still other objects and advantages of the invention will in part be obvious and will in part be apparent from the specification.

SUMMARY OF THE INVENTION

The present invention utilizes a novel method and apparatus for scanning a laser beam across an object in an XY plane raster pattern. Broadly stated, the invention utilizes an electro-mechanical apparatus to scan a spot of light in a raster format at the object plane of interest. The raster scan is developed by using a single reversible motor in combination with orthogonally disposed moveable mirrors connected to indexing and scanning mechanisms to direct a laser beam in both an indexing and scanning laser beam raster format across a plane.

In general, a raster scan covers a defined XY area in a rectangular upward or downward stepwise pattern across the XY area. For example, for a scan starting at the top of the object to be scanned, the beam is moved across the X length of the object along the X-axis plane in a first direction (termed "scanning") until the limit of the X length is reached. The beam is then caused to move downward along the Y-axis plane (termed "indexing") for a predetermined distance, Y/n, where n equals the number of X scan lines to be used to scan the XY area. When the Y/n limit is reached, the beam is caused to scan in a second X-axis direction which is opposite to the first direction until the limit of the X length of the XY area is reached. The beam is then indexed downward for another Y/n length movement along the Y-axis. The above procedure is repeated until the XY area is scanned.

In the present invention, the laser beam enters the scanning apparatus and impinges sequentially upon a first mirror and then a second mirror. Both mirrors are moved orthogonally relative to each other by the rotation of the motor shaft in concert with a synchronized gearing means to provide the intermittent, stepwise XY indexing and scanning movement of the beam over the object to be scanned as described above.

One aspect of the invention comprises a synchronized method for scanning a laser beam across an object in an XY plane raster pattern comprising:

generating a laser beam along a laser path;

generating a rotational motion;

providing a first drive unit slideably mounted on a first object and provided to be moveable linearly back and forth (bi-directionally) along an X-first axis;

providing a first mirror attached to said first drive unit;

providing a second drive unit slideably mounted on a second object and provided to be linearly moveable back and forth along a Y-second axis between predetermined Y distance travel limits, the first axis and second axis being orthogonal;

providing a second mirror attached to said second drive unit;

actuating first intermittent moving means and motion thereof by the rotational motion to move the first drive unit, the first intermittent moving means providing bi-directional motion of the first drive unit along the X-first axis for a predetermined X-scanning distance;

actuating second intermittent moving means and motion thereof by the rotational motion;

providing a Y-second axis advancing means connected with said second intermittent moving means and to the second drive unit to provide an intermittent travel motion for the second drive unit in a particular first direction along the Y-second axis;

providing indicator (feedback) means to indicate when the second drive unit has reached a first predetermined Y distance travel limit at which limit the direction of the rotational motion is reversed or stopped and restarted at predetermined intervals and the second drive unit caused to travel intermittently in a second direction which is opposite to the first direction along the Y-second axis until a second Y distance predetermined limit is reached at which limit (point) the direction of the rotational motion is again reversed;

wherein the laser beam is reflected off the mirrors sequentially and contacts the object to be scanned in a raster motion.

In another aspect of this invention, an apparatus is provide for scanning a laser beam across an object in an XY plane raster pattern comprising:

- a first drive unit slideably mounted on a first object and provided to be moveable linearly back and forth along an X-first axis;
- a first mirror attached to said first drive unit;
- a second drive unit slideably mounted on a second object and provided to be moveable linearly back and forth along a Y-second axis between predetermined Y distance travel limits, the first axis and second axis being orthogonal;
- a second mirror attached to said second drive unit;
- a reversible motor having a rotating shaft;
- a first intermittent moving means connected to the shaft and connected to the first drive unit, the first intermittent moving means providing back and forth (bi-directional) motion of the first drive unit along the X-first axis;
- a second intermittent moving means engageable with the shaft, the second intermittent moving means moving intermittently when the shaft is continuously turning;
- Y-second axis advancing means connected with said second intermittent moving means and to the second drive unit to provide an intermittent travel motion for the second drive unit in a particular first direction along the Y-second axis;
- indicator means to indicate when the second drive unit has reached a first predetermined Y distance travel limit at which limit the direction of the rotation of the motor shaft is reversed and the second drive unit caused to travel intermittently in a second opposite direction along the Y-second axis until a second predetermined Y distance limit is reached at which limit the direction of the rotation of the motor shaft is reversed or stopped.

The method and apparatus of the invention are a low cost laser (optical) delivery system for a variety of laser scanning uses. The invention achieves a significant reduction in the overall cost of laser scanning by reducing the complexity and cost of the scanning apparatus. A wide range of laser beam or other light sources may be employed using the apparatus and method of the invention.

In a preferred laser method and apparatus of the invention, the travel of the first drive unit and the directed laser beam extends beyond the X-plane limits of the object being scanned. In another preferred embodiment the travel of the second drive unit and the directed laser beam extends beyond the Y-plane limits of the object being scanned. In a highly preferred method and apparatus, the travel of both the first drive unit and the second drive unit and the directed laser beam extend beyond the X-plane limits and Y-plane limits, respectively, of the object being scanned. The X-plane and Y-plane limits define the active area of the object to be scanned. The preferred method and apparatus utilizes this preferred overscan of the active area to produce an enhanced constant beam velocity and beam energy density at the active XY plane being scanned. In this manner, the two mirrors in combination develop a raster type scan across the mask or substrate plane while maintaining constant velocity and synchronization across the mask or substrate plane active area. The first moving means and second moving means are positioned and controlled so that indexing (upward or downward movement of the laser beam along the Y axis) occurs out of the active area of the object being scanned. The active area using the preferred method therefore always receives a constant energy and scan speed across the mask or substrate active plane.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1:
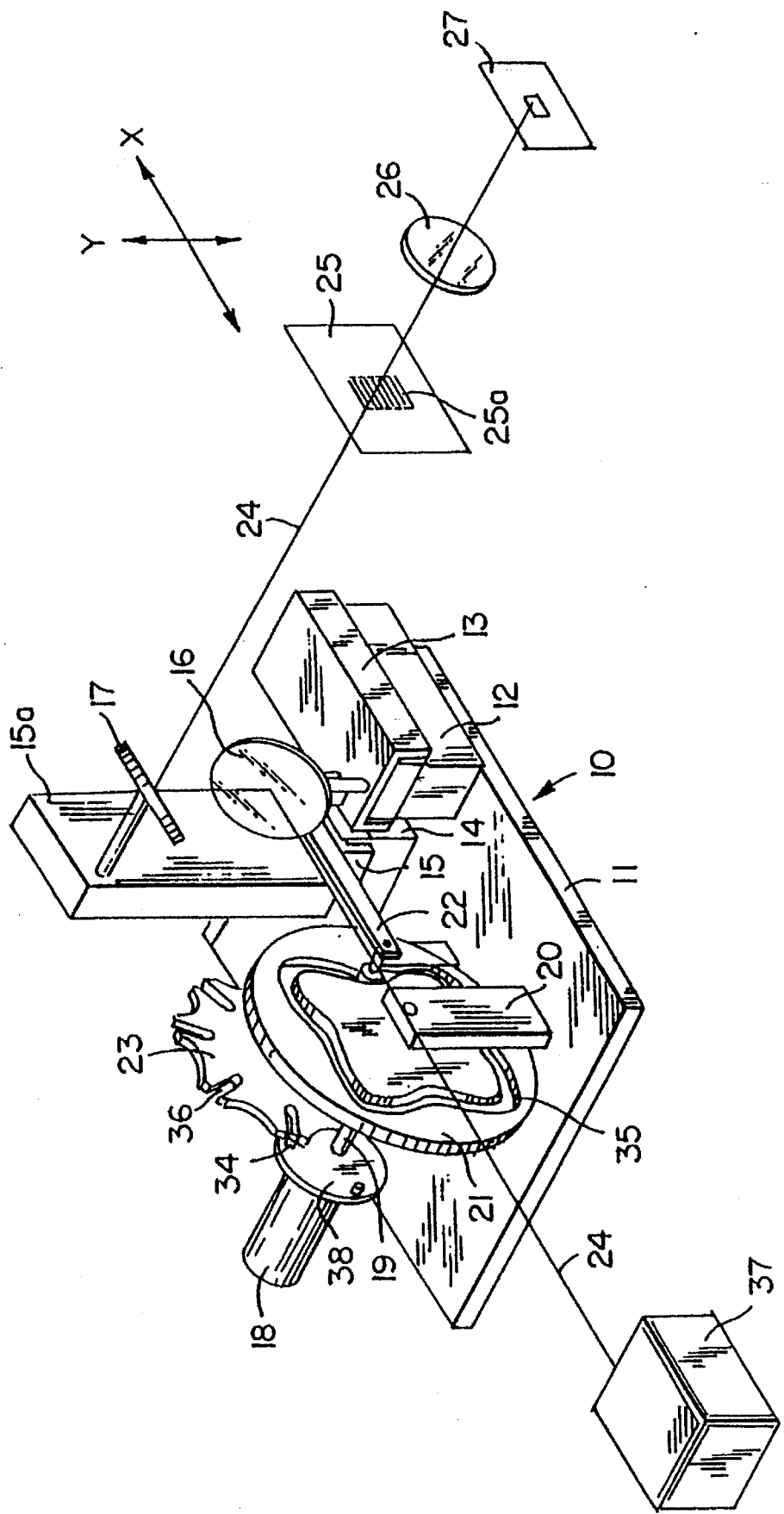
FIG. 1 is a perspective view of a synchronized XY laser scanner of the invention.

In describing the preferred embodiment of the present invention, reference will be made herein to FIGS. 1–3 of the drawings in which like numerals refer to like features of the invention. Features of the invention are not necessarily shown to scale in the drawings.

Referring to FIG. 1, a synchronized XY laser scanner of the invention is shown generally as 10. Laser beam source is shown as 37. The scanner has a base 11 and first object 12 mounted thereon. A first drive unit 13 is slideably mounted on the first object 12 and the first drive unit 13 moves linearly over the first object 12 along the X-axis. A second object 14 has slideably mounted thereon a second drive unit shown as 15 and 15a, 15 and 15a being attached and linearly moveable over second object 14 along the Y-axis. A first mirror 16 is attached to first drive unit 13 and a second mirror 17 is attached to second drive unit 15 and 15a. First drive unit 13 and second drive unit 15 and 15a are preferably substantially frictionless.

Motor 18 is preferably a shunt variable speed reversible DC motor having a shaft 19. Various speeds of up to 300 rpm and higher provides infinite raster scan processing rates. The shaft 19 is rotatably supported by shaft support 20. Mounted on shaft 19 is cam 21 which is shown having eight lobes 35. A cam follower 22 is engaged with cam 21 and connected to first drive unit 13. Gear 23 is an intermittent motion driven gear shown engaged with a precision ball bearing cam follower 34 on a flange 38 attached to shaft 19. Various cam 21 and gear 23 and flange 38 designs may be employed to provide different raster scanning patterns as will be discussed below.

Figure 2A:
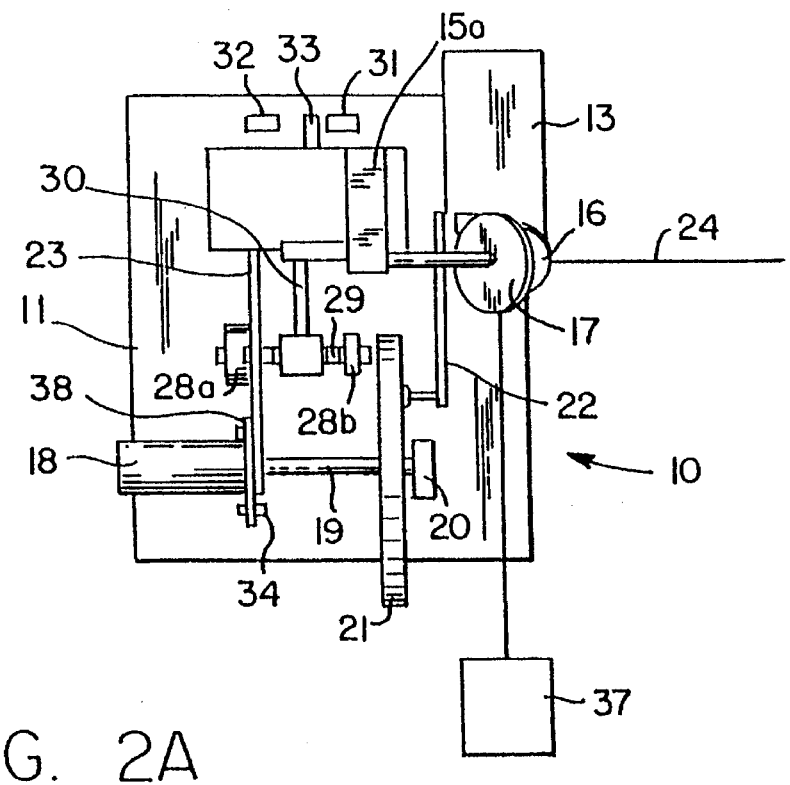
FIGS. 2A and 2B illustrate the top view and side view respectively of the laser scanner of FIG. 1.
Figure 2B:
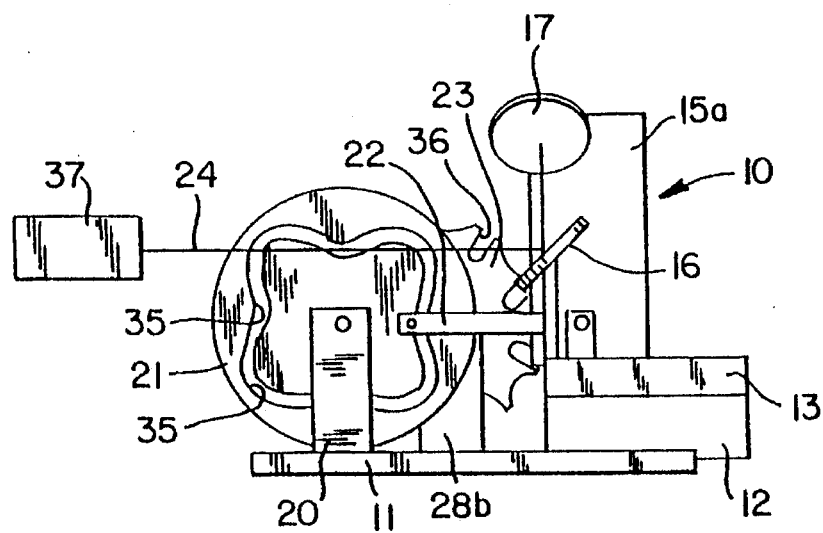

FIGS. 2A and 2B show top and side views respectively of the laser scanner of FIG. 1. Not shown in FIG. 1 are the intermittent driven gear 23 supports 28a and 28b which are rotably connected with lead screw 29. Gear 23 is attached to lead screw 29 and both turn together. Lead screw 29 and second drive unit 15 and 15a are connected by arm 30. Lead screw 29 provides for movement of mirror 17 along the Y-axis of the second object 14. Indicator means 33 is shown attached to second drive unit 15 and is provided to make contact with Y-axis first indicator limit means 31 and second indicator limit means 32. Contact of either indicator limit means by the indicator means 33 will cause the motor to reverse direction so that shaft 19 reverses direction causing gear 23 and lead screw 29 to reverse direction to move the second drive unit 15 in the opposite direction in which it had previously been traveling.

The first indicator limit means 31 and second indicator means 32 may be adjusted to control the length of the Y plane to be scanned by the laser beam, or used to stop and start the scanning at predetermined intervals. Lead screw 29 may be used to control the length of Y axis movement for indexing by using different pitch screw threads. This varies the amount of linear movement of second drive unit 15 and mirror 17 per revolution of lead screw 29 and can be controlled depending on the type scan desired. The length of the X scan can be varied by use of different cams and/or cam followers as will be appreciated to those skilled in the art.

In operation, a light source such as a laser beam 24 is shown directed and reflected off first mirror 16 then second mirror 17 and being directed at mask plane 25. With motor 18 on, motor shaft 19 turns cam 21 with cam follower 22 moving first drive unit 13 and attached first mirror 16 along the plane of first object 12 along the X-axis (scanning). When a lobe 35 of the cam is reached, movement of the first drive unit is interrupted because of the change in direction of the cam follower and the second mirror 17 is the moved in a Y indexing direction due to the synchronized movement of the intermittent gear 23 in concert with cam 21. Intermittent gear moves when gear slots 36 are engaged by cam followers or dowels 34 on flange plate 38. This provides an intermittent motion to gear 23 and accordingly an intermittent linear motion to lead screw 29 and second drive unit 15 and 15a and attached mirror 17. With intermittent gear 23 and cam 21 being configured to operate sequentially, when motion of the second drive unit 15 is interrupted, the first drive unit 13 is caused to move by cam 21 and cam follower 22. Thus, first drive unit 13 and second drive unit 15 move separately in orthogonal directions providing for an XY raster scan 25a of mask plane 25. The laser beam 24 travels through mask plane 25, objective lens 26 and onto working substrate 27. Other laser beam systems can be used with the scanning apparatus of the invention.

It is an important feature of the invention that cam 21 and intermittent gear 23 act sequentially to provide a raster scan pattern. As shown in the figures, cam 21 has eight lobes 35. As cam 21 turns due to the rotation of shaft 19, cam follower 22 follows the cam design and moves first drive unit 13 back and forth along the X-axis. As the cam follower moves between adjacent lobes 35, first drive unit is caused to move in a particular X direction. After the X motion is interrupted due to a lobe 35 being engaged, movement of the cam follower to the next adjacent lobe will cause movement of first drive unit 13 in an opposite direction. Thus, an interrupted back and forth scanning movement along the X axis is provided by cam 21 and cam follower 22. In the cam design shown in the figures, there are eight lobes 35 which provides four complete back and forth cycles of first drive unit 13 or eight individual X axis raster scan lines.

Intermittent gear 23 is shown having eight slots 36. Gears like these include Geneva gears and other intermittent type gear designs. The slots 36 engage protuberances 34 and, when engaged, turn gear 23 by the rotation of shaft 19. When gear 23 is not so engaged with a protuberance 34, the gear is stationary and hence movement of mirror 17 in the Y direction is stationary. Gear 23, like cam 21, can have a number of slots 36 to provide varying intermittent movement of mirror 17, with the proviso that cam 21 and gear 23 be configured to act sequentially to provide a raster scan format.

Figure 3:
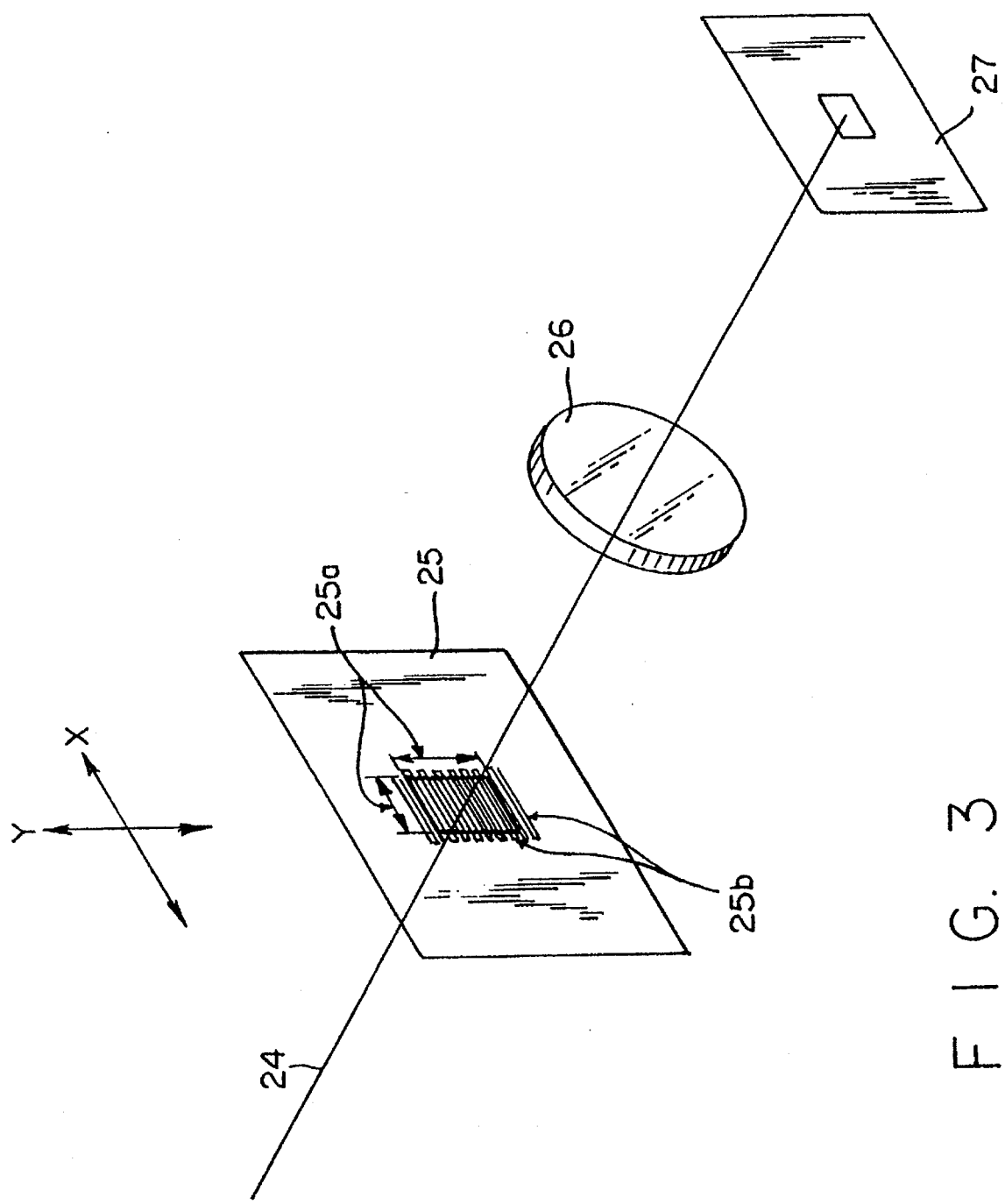
FIG. 3 illustrates the XY scan of the laser scanner of the invention on a mask plane including overscan of the mask plane active area.

FIG. 3 shows a typical raster scan provided by the scanning apparatus and method of the invention. Beam 24 will be scanned on mask plane 25 as shown by overscan 25b. The mask plane active area 25a is shown having only X axis scan lines, the Y axis scan lines being outside the mask plane active area. As discussed hereinabove, this overscan method provides for a constant beam energy and scan speed across the mask active plane and is a highly preferred method for operating the scanning apparatus and method of the invention.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. An apparatus for synchronized X-Y scanning a laser beam across an object comprising:

a first drive unit mounted on a first object and provided to be moveable back and forth along an X-first axis;

a first mirror attached to said first drive unit;

a second drive unit mounted on a second object and provided to be moveable back and forth along a Y-second axis between predetermined travel limits, the first axis and second axis being orthogonal;

a second mirror attached to said second drive unit;

a motor having a rotating shaft;

a first intermittent moving means connected to the shaft and connected to the first drive unit, the first intermittent moving means providing back and forth motion of the first drive unit along the first X axis;

a second intermittent moving means engageable with the shaft, the second intermittent moving means moving intermittently when the shaft is continuously turning;

Y second axis advancing means connected with said second intermittent moving means and to the second drive unit to provide an intermittent travel motion for the second drive unit in a particular first direction along the Y-second axis; and indicator means to indicate when the second drive unit has reached a first predetermined Y distance travel limit at which limit the direction of the rotation of the motor shaft is reversed and the second drive unit caused to travel intermittently in a second opposite direction along the Y-second axis until a second predetermined limit is reached at which limit the direction of the rotation of the motion shaft is reversed or stopped.

2. The apparatus of claim 1 wherein the motor is a reversible variable speed DC motor.

3. The apparatus of claim 1 wherein the first intermittent moving means is a cam.

4. The apparatus of claim 1 wherein the second intermittent moving means is an intermittent gear.

5. The apparatus of claim 1 wherein the Y second axis advancing means is a lead screw.

6. The apparatus of claim 1 wherein the first intermittent moving means is a cam, the second intermittent moving means is an intermittent gear, and the Y second axis advancing means is a lead screw.

7. A synchronized method for scanning a laser beam across an object in an XY plane raster pattern comprising:

generating a laser beam along a laser path;

generating a rotational motion;

providing a first drive unit slideably mounted on a first object and provided to be moveable linearly back and forth along an X-first axis;

providing a first mirror attached to said first drive unit;

providing a second drive unit slideably mounted on a second object and provided to be linearly moveable back and forth along a Y-second axis between predetermined Y distance travel limits, the first axis and second axis being orthogonal;

providing a second mirror attached to said second drive unit;

moving first intermittent moving means by the rotational motion to move the first drive unit, the first intermittent moving means providing back and forth motion of the first drive unit along the X-first axis for a predetermined X-scanning distance;

moving second intermittent moving means by the rotational motion;

providing a Y-second axis advancing means connected with said second intermittent moving means and to the second drive unit to provide an intermittent travel motion for the second drive unit in a particular first direction along the Y-second axis;

providing indicator means to indicate when the second drive unit has reached a first predetermined Y distance travel limit at which limit the direction of the rotational motion is reversed or stopped and restarted at predetermined intervals and the second drive unit caused to travel intermittently in a second direction which is opposite to the first direction along the Y-second axis until a second Y distance predetermined limit is reached at which limit the direction of the rotational motion is again reversed;

wherein the laser beam is reflected off the mirrors sequentially and contacts the object to be scanned in a raster motion.

8. The method of claim 7 wherein the first intermittent moving means is cam.

9. The method of claim 7 wherein the second intermittent moving means is an intermittent gear.

10. The method of claim 7 wherein the Y second axis advancing means is a lead screw.

11. The method of claim 7 wherein the first intermittent moving means is a cam, the second intermittent moving means is an intermittent gear and the Y second axis advancing means is a lead screw.

* * * * *